Figure 1:
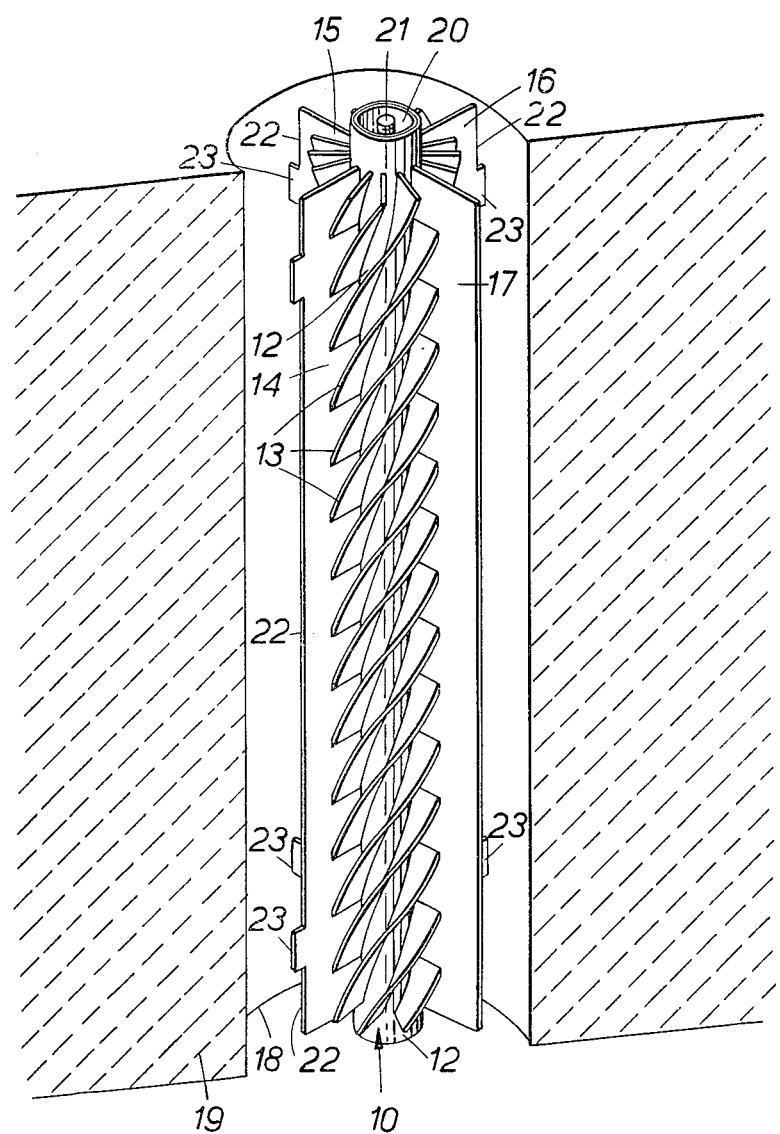

Nov. 9, 1965    R. S. CHALLENDER ETAL    3,216,904
FUEL ELEMENTS FOR NUCLEAR REACTORS
Filed June 26, 1961    2 Sheets-Sheet 1

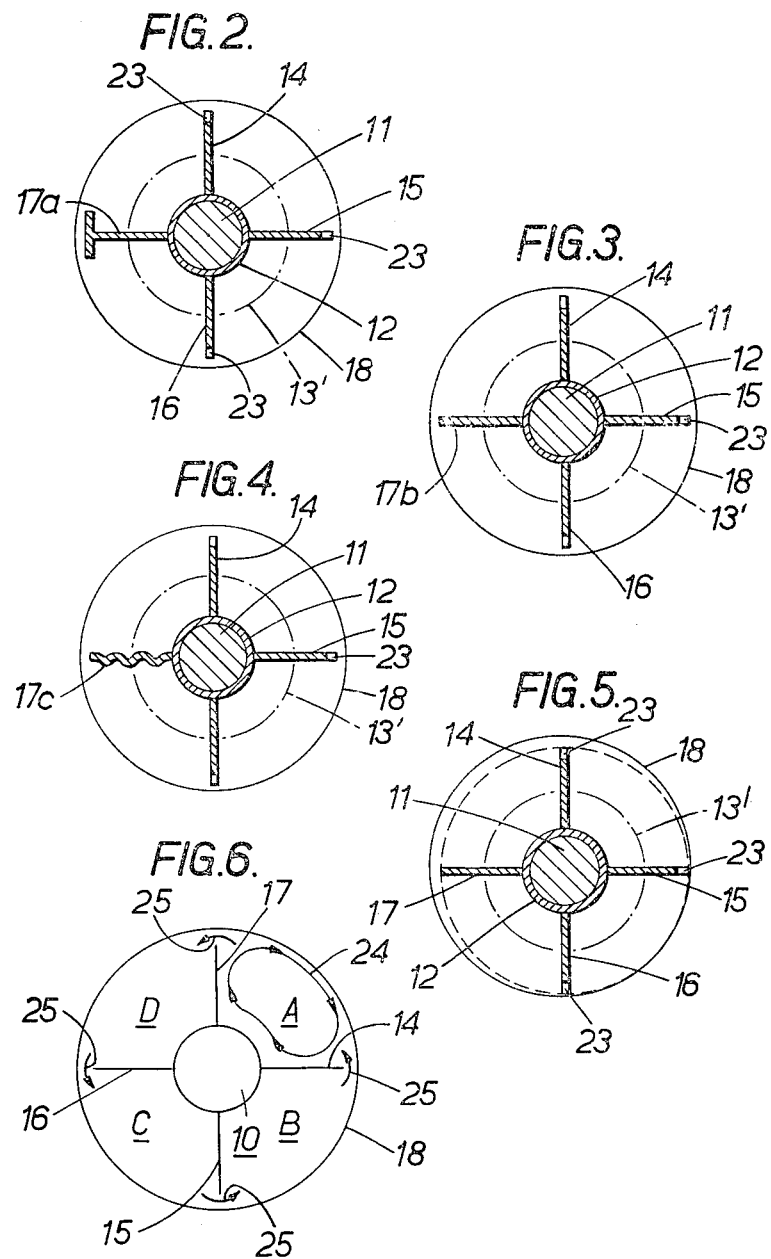

United States Patent Office 3,216,904
Patented Nov. 9, 1965

3,216,904
FUEL ELEMENTS FOR NUCLEAR REACTORS
Ronald Scott Challender, Appleton, Warrington, and Alan Charles Anthony Saunders, Culcheth, Warrington, England, assignors to United Kingdom Atomic Energy Authority, London, England
Filed June 26, 1961, Ser. No. 119,721
Claims priority, application Great Britain, June 27, 1960, 22,393/60; June 30, 1960, 23,020/60
4 Claims. (Cl. 176—81)

This invention relates to fuel elements for nuclear reactors.

The invention is concerned with the type of fuel element known in the art as the "splitter" type fuel element, that is one having helical heat transfer fins intersected by longitudinal splitter fins of greater radial depth than the heat transfer fins.

Tests on the elementary splitter type fuel element have shown that when the element is subjected to coolant flow instabilities may arise which cause chatter of the element and which can lead to damage to the element. It is an object of the invention to provide a splitter type fuel element which has a self stabilising characteristic when subjected to coolant flow.

According to the present invention a splitter type fuel element having four splitter fins is characterised in that three of the splitter fins are of reduced depth for the greater part of their length and the fourth splitter fin is unreduced.

Embodiments of the invention will now be described by way of example with reference to the accompanying drawings wherein FIG. 1 is a cut-away perspective view, FIGS. 2, 3, 4 and 5 are cross-sectional views of alternative forms of the fuel element shown in FIG. 1 and FIG. 6 is a diagrammatic plan view.

In FIGS. 1 to 5 of the drawings is shown a nuclear fuel element 10 which comprises a nuclear fuel member 11 enclosed in a protective sheath 12 and having helical heat transfer fins 13 intersected by longitudinal splitter fins 14, 15, 16, 17, of greater radial depth than the helical fins 13. The element 10 is located in a channel 18 in a moderator structure 19 shown cut-away to expose the element 10. The sheath of the element 10 is closed at each end by end caps 20 which carry screw-threaded spigots 21 (only one end cap 20 and one spigot 21 are shown). Fuel element end locating means such as the complementary cups and cones shown in British Patent No. 779,408 may be secured to the spigots 21 so that the element 10 may be stacked with other, similar elements to form a column.

In the embodiment shown in FIG. 1 the splitter fin 17 is plain. The other three splitter fins 14, 15, 16, have parts 22 of reduced depth at their ends and at their centre region so that two projections 23 of full depth remain on each of the splitter fins 14, 15, 16. These splitter fins 14, 15, 16, are the same in FIGS. 1 to 5 of the drawings, but in FIG. 2 the plain unreduced splitter fin 17 is replaced by a splitter fin 17a which is of the same depth as the fin 17 and has an outer edge of T-section; in FIG. 3 the fin 17 is replaced by a splitter fin 17b with a roughened surface and in FIG. 4 it is replaced by a splitter fin 17c with longitudinal corrugations. FIG. 5 shows the element of FIG. 1 located eccentrically in the channel 18. FIG. 6 shows part of the coolant flow pattern about the fuel element 10.

In FIGS. 2 to 5 the profile of the helical heat transfer fins 13 is indicated by the dot-and-dash circle 13'.

Under test in a coolant flow channel it is found that the element 10 described above with reference to FIG. 1 is remarkably stable. Under coolant flow conditions the element 10 moves to one side of the channel so that the projections 23 on the splitter fin 15 opposite the unreduced fin 17 and on the adjacent fin 16 contact the wall of the channel 18 in which the element is located. This contact is maintained and FIG. 5 shows a fuel element in this position. The splitter fins 14, 15, 16, 17 divide the channel 18 into zones A, B, C, D, as indicated in FIG. 6. In each zone intermixing occurs between the coolant in between the helical fins 13 and the coolant in that zone, the splitter fins serving to deflect the coolant flowing in between the helical fins 13 and thereby causing the coolant in each zone to vortex (as indicated by the arrowed flow loop 24 in zone A, for example). Some of the coolant, however, tends to flow from one zone to the next round the edge of the splitter fins as indicated by the arrow 25 and it is considered that if a symmetrical fuel element is displaced from a central position in the channel 18 the resulting differences in clearance between the channel wall and the edges of the splitter fins affects coolant flow between zones and a precessional force is set up which causes the element to chatter. In the arrangement of the invention pressure build up can occur only in zone A, that is, on one side of the unreduced splitter fin 17 as there is always a clearance between the channel wall and the reduced parts of the splitter fins 14, 15, 16 to allow coolant pressures in zones B, C, D to equalise. Thus the element 10 is maintained in the position shown in FIG. 5.

The stability of the element 10 can be disturbed by stacking similar elements above and/or below it with the customary cup and cone locating means between the fuel elements. However the stability can be restored in a number of ways. In one way the cup and cone locating means are replaced by parallel flat plates or pads so that the elements can move transversely to one another to take up their independent stable positions. In another way, the fuel elements in the stack are similarly orientated. In a third way the "unreduced" splitter fin is made of T-section at its outer edge as shown in FIG. 2 at 17a or alternatively may be of L-section, the flange forming the L being directed in the opposite sense to the direction of the helical fins so that coolant flow round the edge of the splitter fin 17 is reduced. In a fourth way the unreduced splitter fin 17 is given a surface roughening as shown in FIG. 3 at 17b so that drag on that splitter fin is increased with coolant flow in a sense to urge that splitter fin away from the wall of the channel 18. In a fifth way the "unreduced" splitter fin 17 is given a corrugation which also acts to urge the splitter fin away from the wall of the channel 18 the corrugations being longitudinal as shown in FIG. 4 at 17c or inclined to the longitudinal direction. In a sixth way it is arranged that the circumscribing circle of the extreme edges of the splitter fins 14, 15, 16 is made eccentric relative to the axis of the locating cups and cones and that said axis lies nominally on the axis of the channel 18 in which it is located.

We claim:

1. A nuclear reactor fuel element comprising a nuclear fuel member; a protective sheath surrounding said nuclear fuel member; helical heat transfer fins extending from the outer surface of said protective sheath; and four longitudinal splitter fins spaced substantially uniformly around said sheath and intersecting said helical heat transfer fins, said longitudinal splitter fins being of greater radial depth than the heat transfer fins, one of said splitter fins being of uniform depth throughout its length, and the other three splitter fins having portions of reduced radial depth extending over the greater part of the length of the said three splitter fins and having projecting portions of the same radial depth as the said one splitter fin of uniform depth.

2. A nuclear reactor fuel element as claimed in claim 1 wherein the portions of reduced radial depth of the three splitter fins occur at their ends and at their centre region so that two spaced projecting portions of full depth remain on each of said three splitter fins.

3. A nuclear reactor fuel element as claimed in claim 1 wherein said fourth splitter fin is provided with a flange at its outer edge, the flange being directed in the opposite sense to the direction of the helical fins.

4. A nuclear reactor fuel element as claimed in claim 1 wherein said fourth splitter fin has a roughened surface relative to the surfaces of said three splitter fins.

References Cited by the Examiner

UNITED STATES PATENTS

| | | | |
|---|---|---|---|
| 1,838,105 | 12/31 | Murray. | |
| 1,920,800 | 8/33 | McCausland. | |
| 2,898,280 | 8/59 | Schultz | 176—78 |
| 2,906,683 | 9/59 | Quackenbush | 176—64 |
| 3,009,868 | 11/61 | Moulin | 176—30 |
| 3,030,292 | 4/62 | Ritz | 176—81 |

FOREIGN PATENTS

| | | |
|---|---|---|
| 224,581 | 10/59 | Australia. |
| 831,433 | 3/60 | Great Britain. |

OTHER REFERENCES

German printed application No. 1,055,142, April 16, 1959.

CARL D. QUARFORTH, *Primary Examiner.*

REUBEN EPSTEIN, *Examiner.*